March 5, 1946.　　E. F. BURTON ET AL　　2,396,039
AIRCRAFT INTERIOR
Filed Nov. 10, 1941　　6 Sheets-Sheet 1

EDWARD F. BURTON
JOHN A GRAVES
INVENTOR.

BY Edwin Coates
ATTORNEY

March 5, 1946.　　E. F. BURTON ET AL　　2,396,039
AIRCRAFT INTERIOR
Filed Nov. 10, 1941　　6 Sheets-Sheet 3

INVENTOR.
EDWARD F. BURTON
JOHN A GRAVES
BY Edwin Coates
ATTORNEY

March 5, 1946.       E. F. BURTON ET AL       2,396,039
AIRCRAFT INTERIOR
Filed Nov. 10, 1941        6 Sheets-Sheet 4

EDWARD F. BURTON
JOHN A. GRAVES
INVENTOR.

BY Edwin Coates
ATTORNEY

March 5, 1946. E. F. BURTON ET AL 2,396,039
AIRCRAFT INTERIOR
Filed Nov. 10, 1941 6 Sheets-Sheet 5

EDWARD F. BURTON
JOHN A. GRAVES
INVENTOR.

BY J Edwin Coates
ATTORNEY

March 5, 1946.   E. F. BURTON ET AL   2,396,039
AIRCRAFT INTERIOR
Filed Nov. 10, 1941   6 Sheets-Sheet 6

EDWARD F. BURTON
JOHN A. GRAVES
INVENTOR.

BY  *Edwin Coates*
ATTORNEY

Patented Mar. 5, 1946

2,396,039

UNITED STATES PATENT OFFICE 2,396,039

AIRCRAFT INTERIOR

Edward F. Burton and John A. Graves, Los Angeles, Calif., assignors to Douglas Aircraft Company, Inc., Santa Monica, Calif.

Application November 10, 1941, Serial No. 418,456

8 Claims. (Cl. 244—118)

This invention relates in general to an interior design for aircraft cabins and more particularly to an arrangement in which a plurality of compartments for different purposes are provided, which compartments may be readily varied in size to meet variable pay load exigencies.

The utility of an arrangement which permits an aircraft interior to be adjusted to accommodate varying passenger, mail and merchandise loads is based upon a number of characteristics of air transportation, none of which is common to other modes of transportation.

The first of these characteristics is founded on the comparative cost per passenger, pound and ton mile of air transportation, highway and railway carriers. The average transport airplane in operation today costs between 50 and 70 cents per airplane mile as compared to a 20 cent figure per bus mile and a $1.25 figure per average train mile. At first glance it appears that the train mile cost is by far the highest of the three but it must be remembered that the average train can carry a great deal more passengers and cargo than can the other modes of transportation mentioned.

As a result airplane passenger fares approximate 5 cents per mile, bus fares are about 1.75 cents per mile and railroad coach fares vary from 1.5 to 2 cents per mile. In order to successfully compete with the ground carriers the airplane must be designed to operate at a more economical passenger or pound mile cost.

The most popular and widely used transport airplane at the present time is capable of carrying about 6,000 pounds of mail, passengers, or express on an average trip of 400 miles. Because of the high cost per airplane mile the greatest possible use of disposable pay load must be made; otherwise the particular trip will be operated at a loss. The flexible cabin of this invention makes this extensive use of disposable pay load feasible.

At the present time domestic airlines find it necessary to originate schedules from metropolitan centers at all hours of the day and night. Since the average airline passenger makes a trip of about 400 miles and the time required to make such a trip by air is relatively short, the most popular departure times are in the early hours of the morning and in the late afternoon. When departure is made in the morning, arrival at the destination point ordinarily is long before noon, thus allowing use of the greater part of the business day. In the late afternoon, at the close of the business day, the passenger may board an airplane and be returned home that same evening. In view of this situation it is essential that the airlines have available the utmost seating capacity for these popular schedules and the result is that schedules leaving in the middle of the day or between midnight and dawn ordinarily have low passenger load factors but high mail or express pay loads. For example, schedules leaving at noon or shortly thereafter carry air mail picked up in the business district in the middle morning and the evening schedules carry the mail deposited in mail boxes at the close of the business day which, after collection, is sorted and delivered to the airport late in the evening. The same routines apply to air express.

On all schedules leaving metropolitan centers during the mid-day or midnight hours the airlines must provide maximum space for mail and air express. Therefore, it is not uncommon for them to refuse to sell seats to passengers in order that the available space and weight allowance may be used for mail or express. For example, one of the airlines has a schedule leaving New York in the late evening which is used exclusively for air express shipments. That company uses a method of loading air express shipments in canvas bags which fit over and around the seats and are fastened in such a manner as to prevent the shifting of cargo during flight. Another airline operating in the middle-west very often finds it necessary to "block-out" a large number of passenger seats in order to accommodate heavy mail loads destined for Kansas City, Oklahoma City, Fort Worth and Dallas.

Obviously, these methods necessitate a considerable amount of extra work on the part of the airline ground crews in arranging the canvas bags, "blocking-out" seats and the like. Furthermore, the amount and kind of cargo which thus may be carried is greatly restricted. These items run up the cost of transportation and the higher price serves as a barrier to many shippers who would be benefited by the faster service but are unable to utilize it for financial reasons.

In order for air transportation companies to operate efficiently on a low cost per mile basis it is imperative that they do two things: first they must increase their load factor per airplane, and second they must increase their equipment factor. If this can be arranged, equipment depreciation, cost of personnel and maintenance and general operating expense can be figured on an entirely new basis which can result only in more efficient service at a lower cost. This in turn will bring about rapid progress in the transportation field.

As set forth above, under present conditions high density passenger travel is had, say from seven o'clock to nine o'clock in the morning and from four o'clock in the afternoon to seven o'clock in the evening. During these rush periods the airlines usually carry a relatively high load factor per airplane whereas during the mid-day the load factor is so low as to bring the average for the daylight hours down to sixty per cent and below. Thus far, in the history of air transportation it has been found to be impossible to maintain an average passenger seat load factor above sixty per cent because of the travel habits of the public.

Even more important, possibly, is the equipment factor item in reducing operating expenses. Although figures vary in different localities and for different companies, it may be assumed that under average conditions an airplane of the type now used by the airlines stands idle from four to eight hours per day because of the public's travel habits. This is exclusive of short waits at airports en route or time required for maintenance. Four to eight hours do not appear to be of great consequence until it is brought out that modern airplanes can make from two to four trips, say from Los Angeles to San Francisco, in that length of time. This means then that during the lax passenger travel hours these airplanes, representing no small investment, could be utilized for carrying air express and general merchandise.

At first the question arises as to why such a schedule is not now being followed. However, it must be remembered that necessary accommodations for passengers and merchandise are widely varied. In order to carry passengeres the airplane must have seats comfortably upholstered in light and relatively expensive fabrics. Furthermore, the entire airplane cabin interior must be richly finished to a degree in an ornamental and pleasing manner in order to favorably compete with other modes of transportation. On the other hand, for carrying merchandise, the airplane interior must be fairly rugged to prevent damage thereto. Tie-down facilities must be provided to keep the cargo from shifting while in flight and flooring must be free of obstacles to permit the cargo to be loaded in the most efficient manner.

With these requirements in mind the present invention has been developed and accordingly it is a primary object thereof to provide an aircraft cabin interior having a plurality of different purpose compartments, the sizes of which can be readily varied to take the greatest advantage of load and equipment factors.

It is another object of our invention to provide an aircraft cabin interior suitable for carrying passengers or cargo or both in varying amounts dependent upon exigencies by quickly displacing certain seats and panels therein.

It is a further object to provide in an ornamental aircraft cabin interior protective panels for the walls thereof.

Another object is to provide removable seats and attaching devices therefor, the latter being suitable for attaching cargo hold-down fittings when the seats are removed.

Another object is to provide light weight, comfortable seats which are readily removable and foldable into a small, compact unit.

A still further object of our invention is to provide an aircraft cabin interior having a plurality of compartments of different characteristics separated by a movable partition, each face of the partition being constructed to conform to the characteristics of the compartment of which it forms a part.

An additional object is to provide in such a cabin interior a plurality of individual panels in the walls thereof, each panel being hinged and having one side thereof conformable to one compartment of the cabin and the other side thereof conformable to another compartment of the cabin.

Another object is to provide in such a cabin interior a plurality of seats in transverse rows, each transverse row being removable to permit the movable partition to be moved to the position originally occupied by said seats.

Another object is to provide in such a .. in interior a plurality of individual wall panels of a width substantially corresponding to the distance from the back of a transverse row of seats to the back of an adjacent transverse row of seats, each of said panels being hinged and rotatable to reveal the other side thereof when the seats in front of the panel are removed.

Other and further objects of our invention will become apparent after reading the following description in connection with the drawings relating thereto in which.

Figure 1:
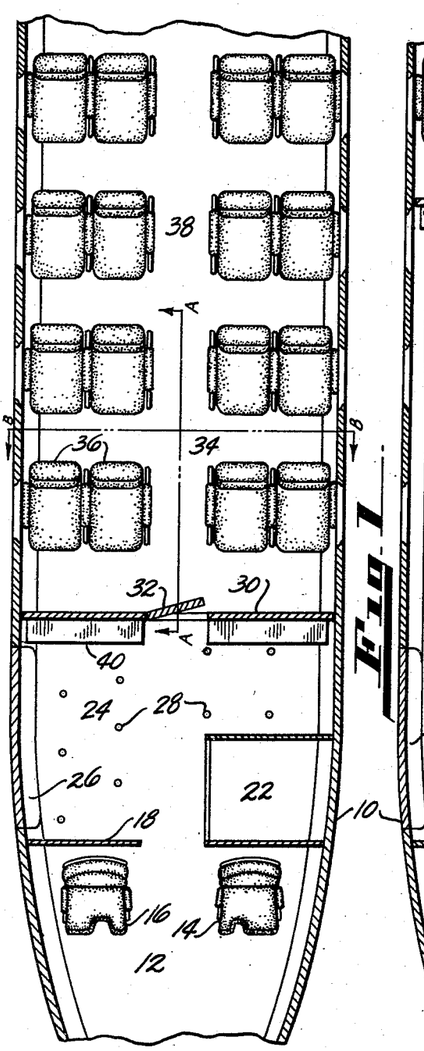
Figure 1 is a sectional plan view of a portion of our aircraft cabin having a plurality of separate compartments including a cargo compartment and a passenger compartment, the latter being provided with rows of seats.

With reference now to the drawings and particularly Figure 1, a portion of an aircraft cabin is indicated by the numeral 10 and within the cabin are a number of compartments beginning with a pilot's compartment 12 in which there are two seats 14 and 16 for the pilot and co-pilot respectively. Forming the rear wall of this compartment is a bulkhead 18 provided with a central opening leading into an L-shaped compartment, so formed in the present instance to provide a separate space 22 which may be used for radio equipment or the like. The L-shaped compartment is what may be termed the normal cargo compartment of the airplane and is provided with an outside cargo loading door 26 at one side thereof. A plurality of fittings 28 are built into the floor and side walls of this compartment to provide means of tying down the cargo load to prevent its shifting during flight.

The normal cargo compartment 24 is bounded at the rear by a large partition 30 with a centrally located door 32 provided therein which opens into a passenger compartment 34 having a plurality of seats 36. These seats are arranged in pair, two pairs to a transverse row and each pair being separated by a central aisle 38 which is in line with the door 32 in the partition 30.

The cabin arrangement as shown in Figure 1 is very much like that normally found in present day transport airplanes which are being operated by the airlines. It is obvious that with such an arrangement the primary purpose of the airplane would be the carrying of passengers, the small cargo compartment being provided only for mail and passengers' luggage which is usually necessarily limited by the airlines to a small amount. However, as set out hereinbefore there is a trend toward air express for the carrying of more general merchandise of a type similar to that now carried by the railroads.

At the present time the volume of air express for the carrying of general merchandise probably would not be sufficient to warrant the investment of the airlines or independent companies in aircraft designed exclusively for carrying such merchandise. Therefore, if an airplane were available which could be readily converted from a passenger airplane to a merchandise carrying airplane it would be ideal from the point of view of an operator who could not feel himself able to invest a large amount of money in an airplane for use exclusively as a passenger transport or as a cargo transport.

With this thought in mind we have developed a convertible airplane interior in which the passenger and cargo compartments may be readily varied in size to meet pay load exigencies.

Figure 2:
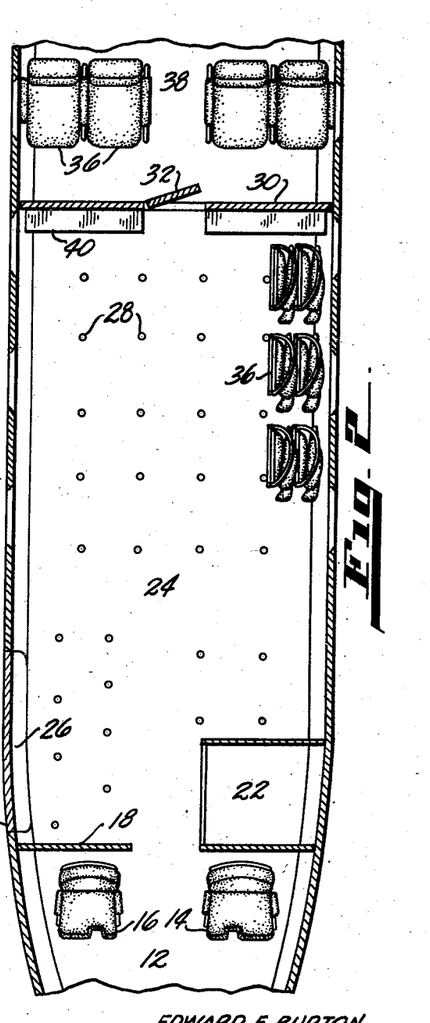
Figure 2 is a sectional plan view of the portion of an aircraft cabin shown in Figure 1 in which the relative sizes of the cargo and passenger compartments have been varied by movement of a transverse partition and the first three transverse rows of seats have been removed from the passeneger compartment, folded and stowed in the cargo compartment.

Referring now to Figure 2 it may be seen that the interior of the cabin shown in Figure 1 has been adjusted to enlarge the cargo compartment 24. This has been done by removing the first three transverse rows of seats 36 and moving the partition 30 to the rear to a position which was previously occupied by the backs of the third transverse row of seats. The seats are of the folding type and these have been stowed in the rear left hand corner of the enlarged cargo compartment. Fittings identical to the fitting 28 are provided to securely hold the passanger seats to the floor and when these seats are removed and folded as in Figure 2, the fittings become available for use as attachments for cargo tie-down means.

The interiors of passenger compartments and cargo compartments differ widely for the reason that passengers demand a comfortable and ornamental interior in order that they may enjoy a pleasant and restful trip. All operators of passenger carriers have been constantly striving to provide richly furnished surroundings for their passengers as an additional appeal.

On the other hand, cargo compartments must be ruggedly lined to prevent damage thereto in the carrying of merchandise and accordingly it would be impossible to use the same interior scheme for both passengers and cargo. To overcome this difficulty we have arranged our cabin interior so that the walls and floor thereof may be converted from the passenger type to the cargo type as the sizes of the compartments are varied.

Figure 3:
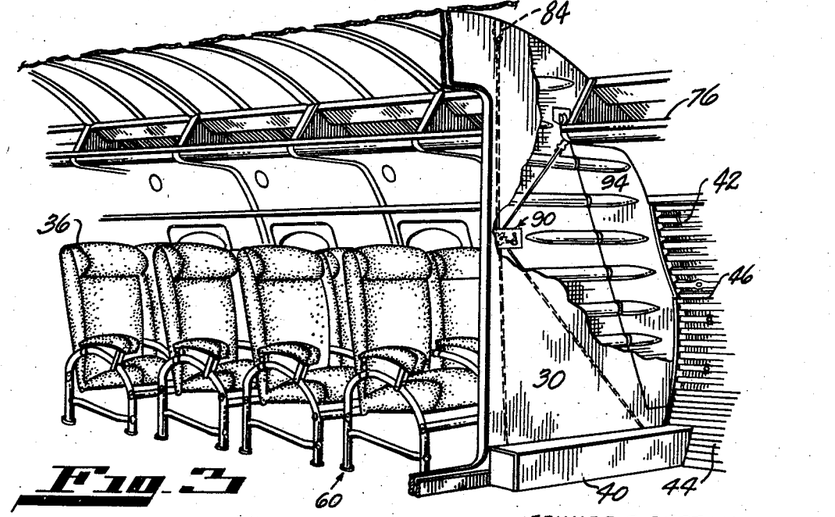
Figure 3 is a fragmentary perspective view of the compartment arrangement of Figure 1 taken in the vicinity of the adjustable partition.
Figure 4:
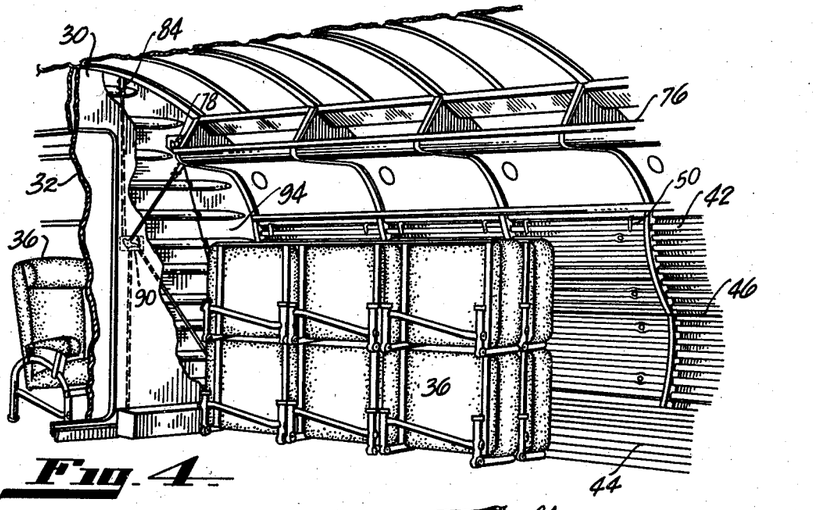
Figure 4 is a fragmentary perspective view of the cabin as it is arranged in Figure 2 wherein the adjustable partition has been moved aft to enlarge the cargo compartment and certain of the passenger seats have been folded and stowed in the cargo compartment.
Figure 9:
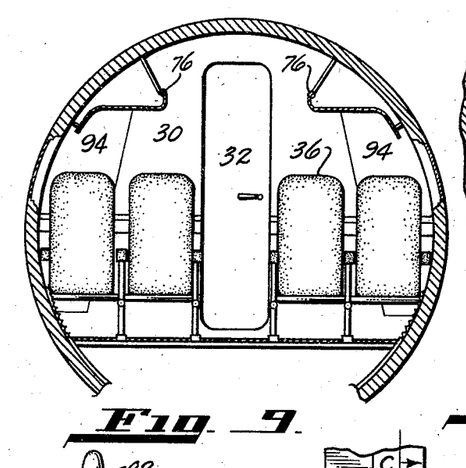
Figure 9 is a sectional view taken on the line B—B of Figure 1 to show the passenger compartment side of the adjustable partition.

In Figures 3 and 4 we have shown close-ups of identical portions of the cabin interior comprising the invention, with Figure 3 showing the partition 30 in its forward position as depicted by Figure 1 and with Figure 4 showing the partition 30 moved aft to the position shown in Figure 2. The passenger compartment side of the partition 30 is finished in a manner conforming to the general pleasant and ornamental interior of the rest of the compartment and this is shown in Figure 9. The cargo compartment side is of corrugated material of a strong and rugged nature covered with sheet metal or the like as may be seen in Figures 3 and 4. At the bottom of the partition 30 on the cargo compartment side there is a box-like structure 40 for housing the passenger compartment rug which is rolled up therein as the size of the passenger compartment is reduced through rearward movement of the partition. The aisle rug is made in sections corresponding in length to the distance between the backs of longitudinally adjacent passenger seats so that any number of these sections may be removed and stowed in the cargo compartment with the folded passenger seats.

Figure 5:
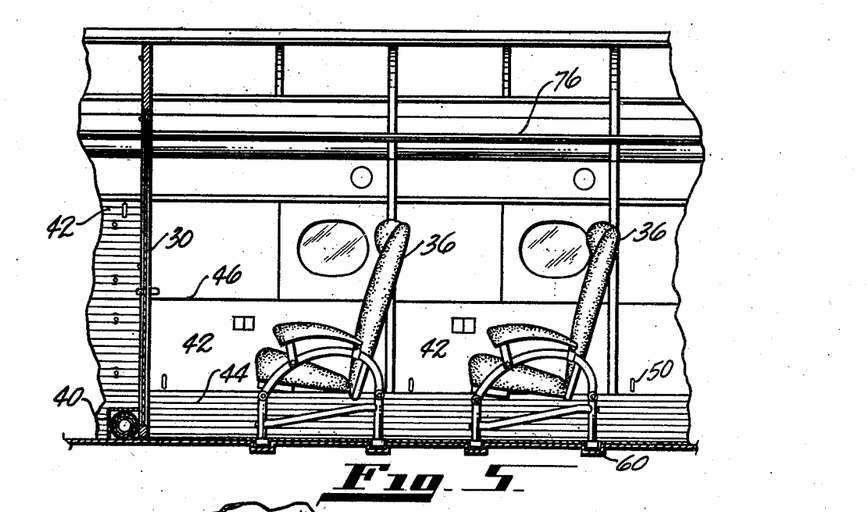
Figure 5 is a sectional side elevational view taken on the line A—A of Figure 1 showing details of the cabin walls in the passenger compartment. Certain of the seats are in position for use.

In order to convert the side walls of the passenger compartment to conform with the general interior of the cargo compartment and protect the cabin windows, hinged panels 42 are provided just above a kick strip 44 and are adapted to rotate upward about a hinge line 46, best shown in Figure 5. These hinged panels are likewise of a length corresponding to the distance between longitudinally adjacent seat backs and the opposite faces thereof are finished in a manner substantially identical to the opposite faces of the adjustable partition 30. An arm rest, ash tray and the like are carried by the passenger compartment side of each of these panels and when the panel is folded upward these passenger accessories are concealed and protected as is the cabin window above the panel. The corrugated inside face of the hinged panel is shown in Figure 4 and in this same drawing it may be seen that when the panel is swung upward it reveals a similarly corrugated cabin wall lining so that substantially the entire interior of the cargo compartment is such that it cannot be readily damaged by the cargo stowed therein.

Figure 6:
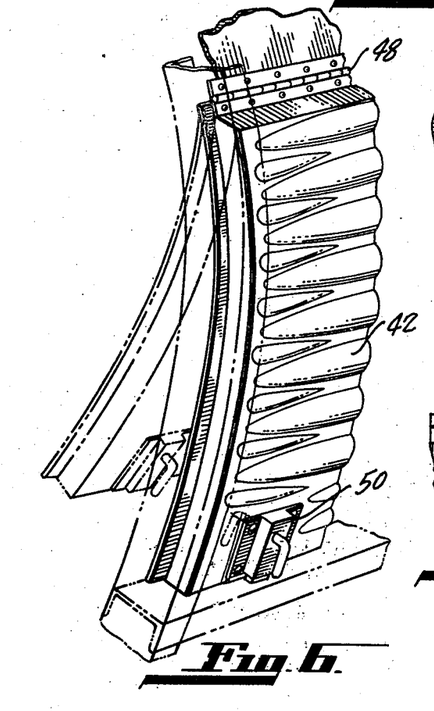
Figure 6 is a fragmentary perspective view of a hinged cabin wall panel disposed adjacent each seat, showing the manner in which it is mounted for swinging from one position to another and showing a latching device for holding the panel in either of its two positions.

In Figure 6 a portion of one of these hinged panels 42 is shown in detail as being attached to the cabin structure by a piano type hinge 48 and latchable in either its downward or upward position by means of a locking device 50 which engages a structural member of the cabin.

Figure 7:
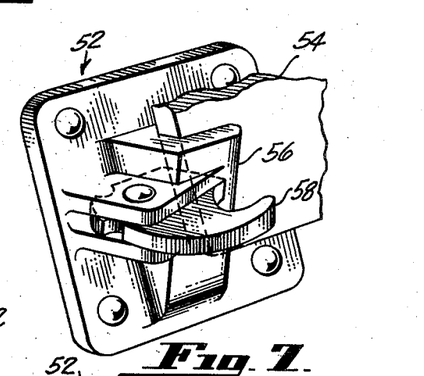
Figure 7 is a perspective view of one of a pair of latching devices provided on the inboard face of each hinged panel for detachably supporting the outboard end of each pair of passenger seats. A portion of one of the seats is shown latched in one of the devices.
Figure 8:
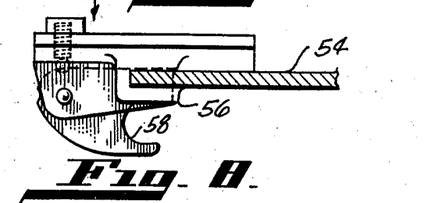
Figure 8 is a plan view of the latching device shown in Figure 7.
Figure 16:
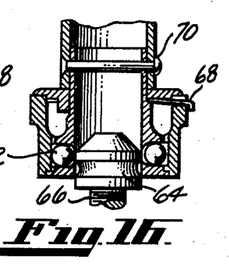
Figure 16 is a sectional view in side elevation of the device of Figure 15 attached to a passenger seat leg and in an unlocked position with respect to the cabin floor bolt so that it may be readily lifted from engagement when it is desired to stow the seat.

As previously discussed, the seats are of the folding type being readily removable from the floor, folded and stowed in the cargo compartment. The outboard side of each pair of seats is not provided with supporting locks but rather attaches to the hinged panel 42 by means of a latch 52 shown in Figures 7 and 8. A plate 54 fixed to the seat slides into a bracket 56 of the latch assembly and is locked therein by a quickly operable latch member 58. The lower extremity of each seat leg is provided with a latch foot 60 having a pair of adjustable balls 62 which are adapted to engage an angular groove 64 of a bolt 66 threaded into the cabin floor. The balls are quickly released from the groove by manipulating a small lever 68 in the latch assembly and rotating an outer collar 69 with respect to the central portion of the latching foot. The outer collar is internally eccentric or, in effect, cam shaped so that rotation thereof radially enlarges or decreases the space in which the balls 62 are carried. The latch assembly proper is riveted to the chair leg as indicated in Figure 16 at 70.

Figure 15:
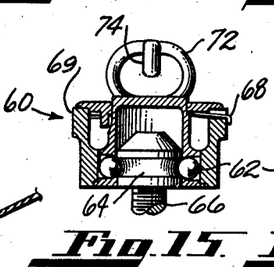
Figure 15 is a sectional view in side elevation of a device used to detachably connect cargo tie down fittings or passenger seat legs to the cabin floor. The device is shown as a cargo tie down fitting in this view and as it appears when locked to a bolt in the cabin floor.

When the chair legs are detached from the floor bolts an identical latch assembly 60 as shown in Figure 15 may be attached to the bolt. The latch assembly is provided with a ring 72 and a pair of hooks 74 to serve as a cargo tie-down means. In this figure the latch assembly is shown in the position wherein it is locked to the floor bolt whereas Figure 16 shows it in the unlocked position.

Figure 10:
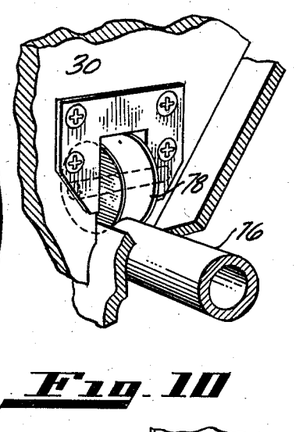
Figure 10 is a fragmentary perspective view of a roller and track assembly by which the adjustable partition is carried.
Figure 11:
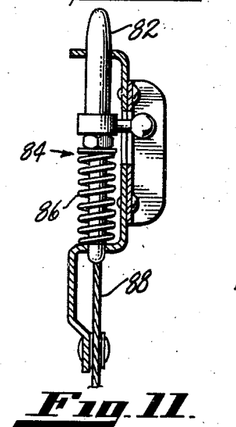
Figure 11 is a sectional view in elevation of one of several spring loaded locking devices distributed about the periphery of the adjustable partition for use in holding the partition securely in any selected position.
Figure 12:
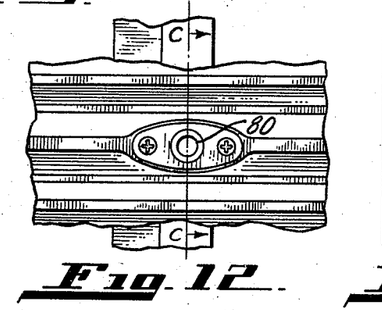
Figure 12 is a front elevational view of one of several lock plates distributed about the cabin wall to receive the bolt portion of the locking device shown in Figure 11.
Figure 13:
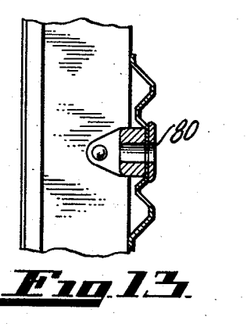
Figure 13 is another view of the lock plate of Figure 12 taken on the line C—C thereof.
Figure 14:
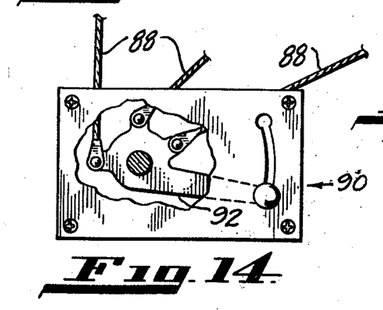
Figure 14 is a front elevational view of a control member for engaging and disengaging the locking device of Figure 11 from the lock plate of Figures 12 and 13.

To return now to the adjustable partition 30, it is carried by a rail 76 which is shown in detail in Figure 10. This rail serves both as a hand hold and as a track upon which the adjustable partition may be moved in varying the size of the passenger and cargo compartments. A roller 78 secured to the adjustable partition is adapted to traverse the rail 76, thus carrying the partition easily from one position to another. At spaced intervals along each side wall of the cabin corresponding to the spaces between the movable side panels 42, there are a plurality of recesses 80, as shown in Figures 12 and 13. These recesses are adapted to receive locking bolts 82 forming a part of an assembly 84. These locking assemblies are spaced around the periphery of the adjustable partition 30 as best shown in Figure 3 and they include the reciprocating bolt 82 which is held in a protruding position by a spring 86 and is adapted to be retracted by a cable 88 attached thereto and extending to a centrally located control 90 placed on either side of the doorway in the partition 30. This control is shown in Figure 14 and has a single lever 92 which is connected through the cables 88 to four of the lock assemblies 84 on one side of the partition. A similar lever forming a part of the control assembly on the other side of the doorway releases the lock assemblies on that side. When these levers 92 are actuated the spring loaded bolts 82 are disengaged from the recesses 80 in the cabin wall, leaving the partition free to roll along the rails 76 to whatever position is desired.

It will be noted that in Figure 3 there is a flap panel 94 hinged to the outer edge of the adjustable partition so as to form a part thereof. This movable panel is provided for the purpose of clearing the arm rests and other protruding articles that may be attached to the hinged panels 42 and it is arranged to be easily latched and unlatched when it is desired to move the partition.

Figure 19:
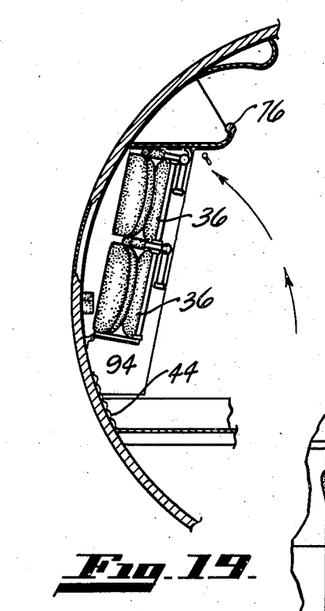
Figure 19 is a fragmentary transverse sectional view of the airplane cabin of Figure 1 showing a different manner in which the seats may be stored by rotating them upward about their attachment with the cabin. It is in this embodiment that the seat member of Figure 18 is utilized.
Figure 20:
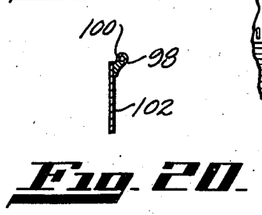
Figure 20 is a sectional view of the seat member taken on the line D—D of Figure 18.

In Figure 19 is shown a different manner of stowing the seats 36 by folding them upward. This and still another way of stowing the seats are shown and described for the reason that different cargo loadings and different operating requirements may make one manner more desirable than another, or possibly it may be expedient to stow some of the seats in one way and some in another.

Figure 17:
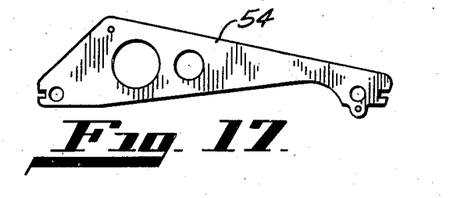
Figure 17 is a side elevational view of a member forming a portion of an outboard seat frame and adapted to engage the latching device of Figures 7 and 8 when the seat is attached to the wall of the airplane cabin.
Figure 18:
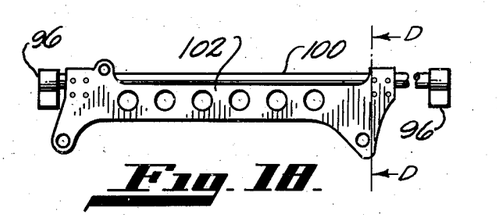
Figure 18 is a side elevational view of a member interchangeable with the seat member shown in Figure 17 for use when it is desired to stow the seat in a manner different from that shown in Figure 4.
Figure 21:
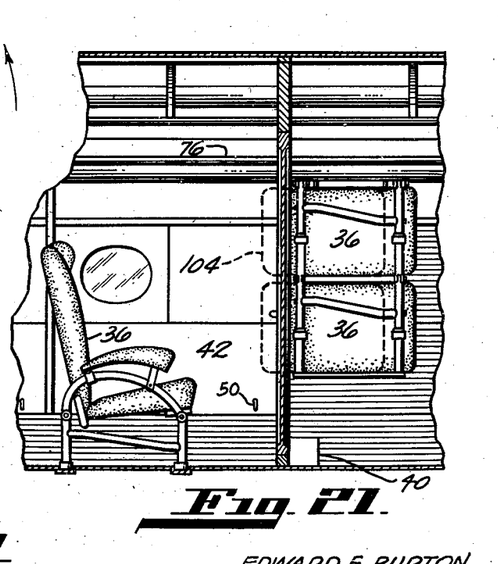
Figure 21 is a fragmentary longitudinal sectional view of the airplane cabin of Figure 19 showing the seats folded against the cabin wall on the cargo compartment side of the adjustable partition.

When using the stowage method of Figure 19 it is even unnecessary to provide hinged side panels in the cabin wall for the reason that the seats, when folded toward the wall serve as adequate protection. If the seats are to be stowed in this manner the seat latches 52 of Figures 7 and 8 and the seat plate 54 of Figure 17 are replaced by a pair of brackets 96 having bearing eyes 98 supporting a shaft 100 therein for rotation on its longitudinal axis and a seat plate 102 of the type shown in Figure 18. The seat plate is rotatable on the shaft and capable of being displaced longitudinally therealong. When the seats are to be stowed, the floor fittings are unlocked and the seats rotated upward to a position shown by dotted lines 104 in Figure 21. Then they are slid forward on the shaft to a final stowed position wherein they are clear of the station occupied by the adjustable partition when it is latched in place. It will be noted particularly in Figure 19 that the cut-out occupied by the flap panel 94 in the adjustable partition is made of a size and shape to clear the stowed seats when it is moved therepast.

Figure 22:
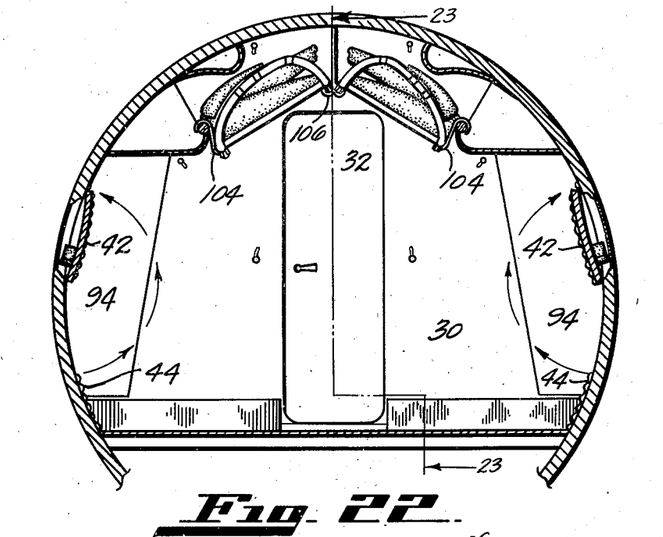
Figure 22 is a fragmentary transverse sectional view of the airplane cabin of Figure 1 showing still another manner of stowing the seats by folding them and suspending them from the cabin ceiling and baggage rack.
Figure 23:
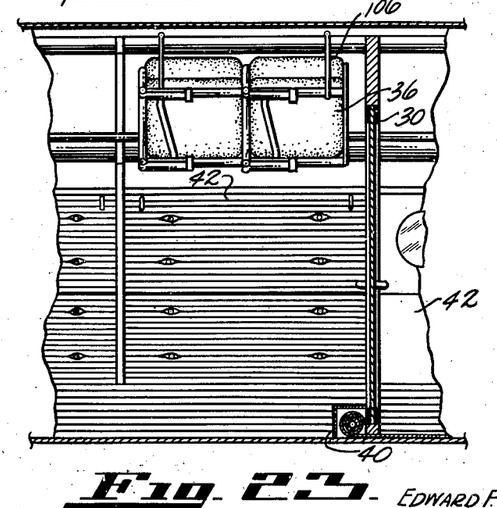
Figure 23 is a fragmentary longitudinal sectional view of the airplane cabin of Figure 22 showing the seats suspended from the cabin ceiling and baggage rack on the cargo compartment side of the adjustable partition.

A third way of stowing the seats, and perhaps the best way under many conditions, is that shown in Figures 22 and 23. Here, the seats have been removed from their floor attachments, folded and suspended from the cabin ceiling and baggage rack on either side of the aisle. Using this method, the floor of the cargo compartment is left completely free and, in addition, headroom is not impaired to any great extent since the aisle clearance is no less than that through the adjustable partition doorway.

Baggage rack attaching hangers 104 for the seats are adapted to be folded around and nested in the baggage rack as are ceiling hangers 106 adapted to be nested therein.

From the foregoing it may be seen that we have provided a cabin interior which may be easily converted in a very short length of time from a full passenger carrying airplane to a full cargo carrying airplane or to any in-between condition desired. In doing so there has been no sacrifice of desirable features in either compartment and the conversion can be accomplished with an extremely small amount of labor and by only one man, if necessary.

While we have herein shown and described our invention in its present preferred embodiment, it will be obvious to those skilled in the art after studying the foregoing description in connection with the drawings that various modifications may be made therein without departing from the scope of the invention as defined by the appended claims.

We claim:

1. In an aircraft, a cabin, a combination handrail and baggage rack frame bar extending longitudinally of the cabin on each side thereof, a longitudinally movably mounted transverse partition wall dividing the cabin longitudinally into two compartments, means for suspending the partition wall from said bars for sliding movement along said bars, and means for locking the partition wall in any one of a number of positions of longitudinal adjustment between and including two extreme positions longitudinally of the cabin.

2. An aircraft cabin including: a forward section for the accommodation of a pilot; a rearward section for the accommodation of passengers and cargo; a vertical partition extending transversely of said rearward section from side to side thereof and dividing said section into passenger and cargo compartments; an access opening in said partition for ingress or egress from one compartment to the other; fittings spaced along the length of the rearward section to secure the partition in different longitudinal positions to selectively increase or decrease the sizes of the respective compartments; and fitting means in the floor of said rearward section for the selective reception of chair supports or cargo hold-down fittings.

3. An aircraft cabin including: a forward section for the accommodation of a pilot; a rearward section for the accommodation of passengers and cargo; a vertical partition extending transversely of said rearward section from side to side thereof and dividing said section into passenger and cargo compartments; an access opening in said partition for ingress or egress from one compartment to the other; sets of spaced fittings disposed along the length of the rearward section between two extreme positions longitudinally of the same; means carried by said partition and engageable with a selected set of said fittings to secure the partition in any one of a plurality of positions longitudinally of said rearward section between said two extreme positions to selectively increase or decrease the size of the respective compartments, said partition when the means thereof are engaged by said fittings in one of said extreme positions defining a minimum cargo compartment and a maximum passenger compartment; and fitting means in the floor of said rearward section for the selective reception of chair supports or cargo hold-down fittings.

4. The combination claimed in claim 3 in which a plurality of panel units are carried by each side wall of said cabin and extend between the said extreme positions, each panel unit being adjustable to selectively expose a ruggedly constructed surface suitable for an interior of the cargo compartment or a surface presenting a finish suitable for use as an interior for the passenger compartment.

5. The combination defined in claim 3 in which a plurality of panel units are carried by each side wall of said cabin and extend between the said two extreme positions, each unit comprising an upper and lower panel hingedly connected at the adjacent edges thereof, both panels having an outer surface presenting a finish suitable for passenger use on the outer side thereof, the inner surface of each lower panel being formed with a ruggedly constructed surface suitable for an interior of the cargo compartment, said lower panel being adapted to be swung upwardly to a position overlying said upper panel to expose said ruggedly constructed surface and to protect the outer surface of said upper panel.

6. The combination defined in claim 3 in which a plurality of panel units are carried by each side wall of said cabin and extend between the said two extreme positions, each unit comprising an upper and lower panel hingedly connected at the adjacent edges thereof, both panels having an outer surface presenting a finish suitable for passenger use on the outer side thereof, the inner surface of each lower panel being formed with a ruggedly constructed surface suitable for an interior of the cargo compartment, said lower panel being adapted to be swung upwardly to a position overlying said upper panel to expose said ruggedly constructed surface and to protect the outer surface of said upper panel, an arm rest secured to each lower panel and exposed for use when said lower panel is in its lower position; each side wall of said cabin having a plurality of windows formed therein, said upper panels having window openings aligned with said windows, said arm rests moving into and being received within said window openings when the lower panels are swung upwardly to expose the inner surface of the same.

7. The combination defined in claim 3 in which a plurality of panel units are carried by each side wall of said cabin and extend between the said two extreme positions, each unit comprising an upper and lower panel hingedly connected at the adjacent edges thereof, both panels having an outer surface presenting a finish suitable for passenger use on the outer side thereof, the inner surface of each lower panel being formed with a ruggedly constructed surface suitable for an interior of the cargo compartment, said lower panel being adapted to be swung upwardly to a position overlying said upper panel to expose said ruggedly constructed surface and to protect the outer surface of said upper panel, each side wall of said cabin having a plurality of windows formed therein, said upper panels having window openings aligned with said windows, said lower panels covering said window openings when the lower panels are swung upwardly to protect the upper panels.

8. The combination claimed in claim 3 in which a plurality of foldable chairs are pivotally mounted to the side walls of said cabin between the said two extreme positions of adjustment of said partition, said chairs being adapted to be folded to a compact shape and swung up into a storage position against the upper portions of the side walls of said cabin; and in which lateral edge portions of said partition are hingedly connected to the remainder of said partition and adapted to be swung back to present clearance openings in the edge portions of said partition for said stored chairs to permit said partition to be moved longitudinally of said cabin to increase the size of the cargo compartment thereof.

EDWARD F. BURTON.
JOHN A. GRAVES.